(12) United States Patent
Haines

(10) Patent No.: US 6,432,565 B1
(45) Date of Patent: *Aug. 13, 2002

(54) PRODUCING ELECTRICAL ENERGY FROM NATURAL GAS USING A SOLID OXIDE FUEL CELL

(75) Inventor: Michael Rennie Haines, Rijswijk (NL)

(73) Assignee: Shell Oil Company, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,560

(22) Filed: Aug. 26, 1998

(30) Foreign Application Priority Data

Aug. 26, 1997 (EP) .................................. 97306484

(51) Int. Cl.⁷ ................................................ H01M 8/06
(52) U.S. Cl. ............................. 429/17; 429/20; 429/33
(58) Field of Search .............................. 429/17, 20, 26, 429/33, 47

(56) References Cited

U.S. PATENT DOCUMENTS

| | | | |
|---|---|---|---|
| 475,115 A | 5/1892 | Inglesby et al. | |
| 4,250,230 A | 2/1981 | Terry | 429/12 |
| 4,729,931 A * | 3/1988 | Grimble | 429/17 |
| 4,751,151 A * | 6/1988 | Healy et al. | 429/17 |
| 4,994,331 A * | 2/1991 | Cohen | 429/17 |
| 5,133,406 A | 7/1992 | Puri | 166/266 |
| 5,232,793 A * | 8/1993 | Miyauchi et al. | 429/17 X |
| 5,527,631 A * | 6/1996 | Singh et al. | 429/33 X |
| 5,840,437 A * | 11/1998 | Diethelm | 429/26 X |
| 5,900,329 A * | 5/1999 | Reiter et al. | 429/17 |

FOREIGN PATENT DOCUMENTS

| | | | |
|---|---|---|---|
| DE | 4033289 A1 | 4/1991 | H01M/4/86 |
| EP | 0 473 153 A2 | 3/1992 | H01M/8/06 |
| EP | 0 482 222 A | 4/1992 | |
| JP | 63-110167 | 5/1988 | H01M/8/24 |
| JP | 06203845 | 7/1994 | H01M/8/00 |
| NL | 8901841 | 2/1991 | |

OTHER PUBLICATIONS

Eckaus, R. S. et al., "Economic Assessment of $CO_2$ Capture and Disposal" Energy Conversion & Management, vol. 38, No. 1001, 1997, p. 5621–5627XP004061666, See p. 5622, last paragraph—p. 5623, paragraph 2, (Month unknown).
Search Report dated Jan. 27, 1999, PCT.
Kirk–Othmer, Encyclopedia of Chemical Technology, 4th Ed., vol. 11, pp. 1114–1121.
Minh, Nguyen Q., "Ceramic Fuel Cells," Journal of the American Ceramic Society, Mar. 1993, pp. 563–588.

* cited by examiner

Primary Examiner—Stephen Kalafut

(57) ABSTRACT

A process of generating electricity from natural gas comprises supplying air to the cathode side of a solid oxide fuel cell; converting at the anode side of the fuel cell the natural gas to hydrogen and carbon monoxide and allowing the cathode and anode reactions to take place to produce a potential difference between anode and cathode wherein an anode off-gas is produced which comprises water and carbon dioxide and feeding the anode off-gas from the anode side to a ceramic afterburner in which any unburned carbon monoxide and hydrogen are combusted without addition of nitrogen to the anode off-gas.

11 Claims, 2 Drawing Sheets

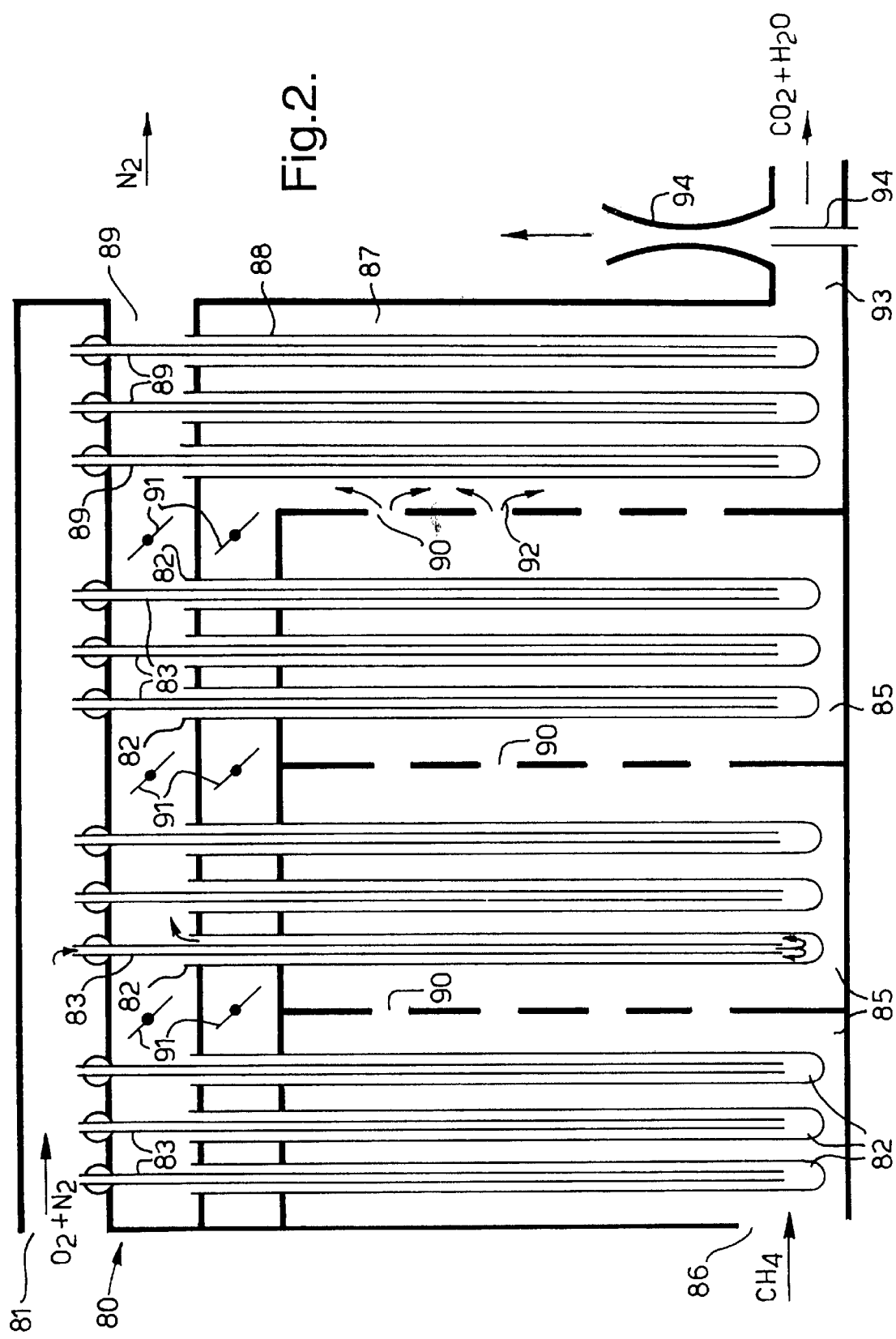

PRODUCING ELECTRICAL ENERGY FROM NATURAL GAS USING A SOLID OXIDE FUEL CELL

This application claims the benefit of application Ser. No. 97/306,484.3 filed on Aug. 26, 1997 in Europe under 35 U.S.C. §119, §365(a), or §365(b).

FIELD OF THE INVENTION

The present invention relates to a process for producing electrical energy from natural gas using a solid oxide fuel cell.

BACKGROUND OF THE INVENTION

A fuel cell is an electrochemical cell which can continuously convert the chemical energy of a fuel and an oxidant to electrical energy by a process involving an invariant electrode-electrolyte system. Here the expression fuel cell is also used to refer to a multiplicity of cells, which can be arranged in series or in parallel.

A solid oxide fuel cell is a fuel cell comprising an anode side and a cathode side separated from each other by means of a solid electrolyte. The solid electrolyte is for example a mixture of yttria and zirconia. Charge transfer through the electrolyte from the cathode to the anode is done by oxygen ions.

The overall cathode reaction of a solid oxide fuel cell is $1/2(a+b)O_2 + 2(a+b)e^- \rightarrow (a+b)O_2^-$; and the overall anode reaction is $aH_2 + bCO + (a+b)O_2^- \rightarrow aH_2O + bCO_2 + 2(a+b)e^-$.

The anode off-gas thus comprises carbon dioxide and water.

Applicant is particularly interested in operating the fuel cell near a well which produces hydrocarbon fluids from an underground reservoir, this can be a gas well or an oil well which also produces associated gas. In both cases a methane-containing gas at high pressure (25–50 MPa) is available. Carbon dioxide obtained as effluent from the process is stored in a receptacle, which can be an underground reservoir. To this end the carbon dioxide has to be compressed to a pressure that allows injecting the carbon dioxide in the underground reservoir. The underground reservoir can be the reservoir from which the hydrocarbon fluids are recovered or an aquafier layer. Thus there are no carbon dioxide emissions.

It is known from European patent specification No. 482.222 to generate electricity from high pressure natural gas using a solid oxide fuel cell. The known process comprises the steps of (a) supplying oxidant to the cathode side of the fuel cell;
(b) converting at the anode side of the fuel cell the natural gas to hydrogen and carbon monoxide and allowing the cathode and anode reactions to take place to produce a potential difference between anode and cathode wherein an anode off-gas is produced which comprises water and carbon dioxide;
(c) removing oxygen-depleted oxidant from the outlet of the cathode side and removing the anode off-gas from the outlet of the anode side;
(d) feeding the anode off-gas from the outlet of the anode side of the fuel cell to an afterburner installation;
(e) partially condensing the anode off-gas and removing water from the anode off-gas to produce a stream rich in carbon dioxide;
(f) compressing stream rich in carbon dioxide to a predetermined pressure;
(g) cooling the compressed stream rich in carbon dioxide at least partly by indirect heat exchange with the natural gas stream which is supplied to the fuel cell to obtain an at least partly liquefied stream rich in carbon dioxide;
(h) separating uncondensable gas from the at least partly liquefied stream rich in carbon dioxide; and
(i) storing the at least partly liquefied stream rich in carbon dioxide in a receptacle.

In the process disclosed in European patent specification No. 482.222 a conventional afterburner installation is used which is a high temperature oxidation process in which a substantial amount of nitrogen is added to the anode off-gas.

It is an object of the present invention to provide a improved process for producing electricity from natural gas using a solid oxide fuel cell which is provided with an afterburner installation in which the addition of nitrogen to the anode off-gas is minimal or eliminated.

SUMMARY OF THE INVENTION

In the process according to the present invention a ceramic afterburner installation is used in which unburned carbon monoxide and hydrogen are combusted without addition of a substantial amount of nitrogen to the anode off-gas.

There is provided a process of generating electricity from natural gas using a solid oxide fuel cell comprising the steps of.

(a) converting at the anode side of the fuel cell the natural gas to hydrogen and carbon monoxide and allowing the cathode and anode reactions to take place to produce a potential difference between anode and cathode wherein an anode off-gas is produced which comprises water and carbon dioxide;
(b) removing oxygen-depleted oxidant from the outlet of the cathode side and removing the anode off-gas from the outlet of the anode side;
(c) feeding the anode off-gas from the outlet of the anode side of the fuel cell to an afterburner installation;
(d) partially condensing the anode off-gas and removing water from the anode off-gas to produce a stream rich in carbon dioxide;
(e) compressing the stream rich in carbon dioxide to a predetermined pressure;
(f) cooling the compressed stream rich in carbon dioxide at least partly by indirect heat exchange with the natural gas stream which is supplied to the fuel cell to obtain an at least partly liquefied stream rich in carbon dioxide;
(g) separating uncondensable gas from the at least partly liquefied stream rich in carbon dioxide; and
(h) injecting the at least partly liquefied stream rich in carbon dioxide into a receptacle;

characterised in that the step (c) of feeding the anode off-gas to the afterburner installation comprises feeding the anode off-gas to a ceramic afterburner installation in which unburned carbon monoxide and hydrogen are combusted without addition of a substantial amount of nitrogen to the anode off-gas.

BRIEF DESCRIPTION OF THE DRAWINGS

FIG. 2 shows schematically a solid oxide fuel cell provided with a ceramic afterburner installation.

DESCRIPTION OF THE PREFERRED EMBODIMENTS

Figure 1:
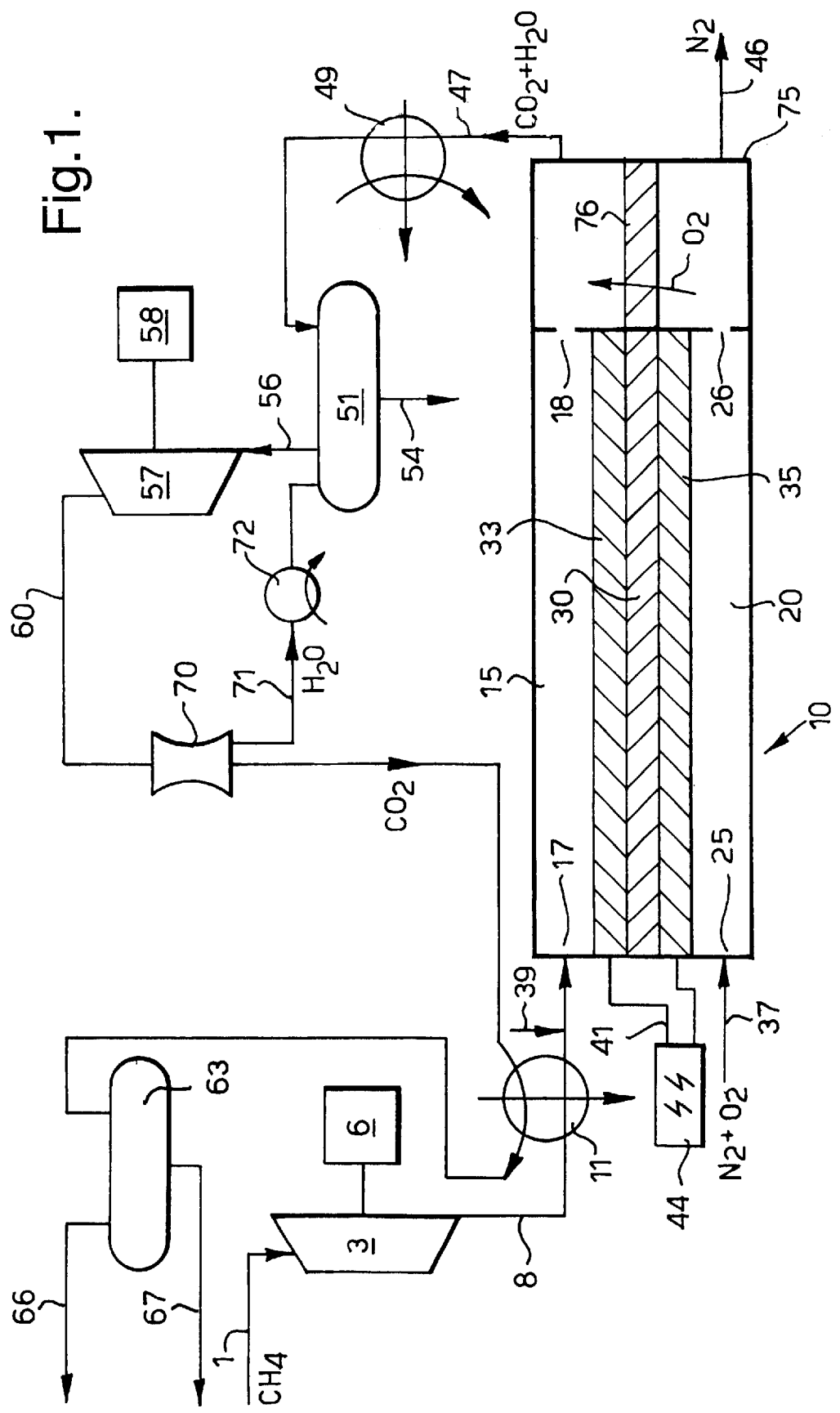
FIG. 1 shows schematically a plant for carrying out the present invention.

Nitrogen forms a substantially uncondensable gas which is difficult to remove from the anode off-gas and therefore complicates the procedure of storing of the anode off-gas in a receptacle.

The present invention provides an integrated process, wherein electrical energy can be obtained at low pressure from high pressure natural gas, and wherein liquefied carbon dioxide is produced at elevated pressure which can be injected into an underground reservoir. In the process of the invention the energy obtained by expansion of natural gas supplied to the fuel cell is suitably used to at least partly compress the stream rich in carbon dioxide discharged by the fuel cell.

A solid oxide fuel cell operates at high temperatures, about 1000° C., and this allows at least part of the conversion of methane to hydrogen and carbon monoxide to be carried out in the solid oxide fuel cell, which reaction is catalysed by metals in the anode. Therefore suitably step (b) comprises allowing in the anode side of the solid oxide fuel cell the heated low pressure natural gas stream to react with water to form hydrogen and carbon monoxide, and allowing the cathode and anode reactions to take place to produce a potential difference between anode and cathode wherein an anode off-gas is produced which comprises water and carbon dioxide.

Initially, some water has to be added to the natural gas to initiate the methane-conversion reaction, however, subsequently water obtained in the anode reaction will react with methane.

The invention also relates to a solid fuel cell which is equipped with an afterburner installation.

In accordance with the invention the afterburner installation comprises a ceramic membrane which is substantially permeable to oxygen and substantially impermeable to nitrogen through which membrane oxygen is supplied to the anode off-gas for oxidation of unburned components in the anode off-gas.

Preferably the ceramic membrane is a high temperature oxygen ceramic oxide membrane which is an oxygen-ion conductor.

Suitably the fuel cell and afterburner installation are both equipped with a series of ceramic membrane tubes which are closed at one end and through which air is circulated.

Reference is now made to U.S. Pat. No. 4,751,151. This publication discloses a process for producing electrical energy from a fossil fuel which is first converted in a reformer into a hydrogen-rich fuel gas that also contains carbon dioxide. The known process comprises supplying the hydrogen-rich gaseous fuel to the inlet of the anode side of a fuel cell; supplying air to the cathode side of the fuel cell and removing depleted air from the outlet of the cathode side; allowing the anode reaction ($H_2 \rightarrow 2H^+ + 2e^-$) and the cathode reaction ($1/2O_2 + 2H^+ + 2e^- \rightarrow H_2O$) to take place to produce a potential difference between anode and cathode; removing hydrogen-depleted anode off-gas from the anode side; and removing carbon dioxide from the hydrogen-depleted anode off-gas.

In the known process a non-alkaline fuel cell in the form of an acid fuel cell is used which is tolerant to carbon dioxide. So that the carbon dioxide produced as a by-product in the conversion of the fossil fuel to hydrogen does not adversely affect the performance of the fuel cell.

Removing carbon dioxide from the anode off-gas is done by absorbing carbon dioxide in an aqueous absorption solution which is regenerated to recover the carbon dioxide for a useful purpose.

This publication is not relevant to the present invention because it does not disclose an integrated process for producing electrical energy from high pressure natural gas. Moreover this publication does not disclose recovering carbon dioxide by means of liquefying it at elevated pressure.

The invention will now be described by way of example in more detail with reference to the accompanying drawings.

FIG. 1 shows a flow-scheme of the process of generating electricity according to the present invention. High pressure natural gas is supplied through conduit 1 to an expansion engine in the form of a turbo expander 3, in which turbo expander 3, the high pressure natural gas is expanded to a lower pressure. The turbo expander 3 drives a load in the form of electric generator 6. Low pressure natural gas is passed through conduit 8 to a solid oxide fuel cell 10. The low pressure natural gas passing through conduit 8 is heated by indirect heat exchange in heat exchanger 11.

The solid oxide fuel cell 10 comprises a cathode side 15 having an inlet 17 and an outlet 18, and an anode side 20 having an inlet 25 and an outlet 26. In between the cathode side 15 and the anode side 20 is arranged a solid electrolyte 30, provided with an anode 33 at the side of the solid electrolyte facing the anode side 15 and a cathode 35 at the opposite side of the solid electrolyte 30.

Oxidant in the form of air is supplied to the inlet 25 of the cathode side 20 of the solid oxide fuel cell 10 through conduit 37.

With water supplied through conduit 39 the heated low pressure natural gas is supplied to the inlet 17 of the cathode side 15 of the solid oxide fuel cell 10. In the cathode side 15 the low pressure natural gas is converted to hydrogen and carbon monoxide. The conversion takes place according to the reaction $H_2O + CH_4 \rightarrow 3H_2 + CO$. At the cathode 35 the cathode reaction takes place, wherein oxygen ions are produced which can pass through the solid electrolyte 30 to the anode 33, where the anode reaction takes place wherein an anode off-gas is produced comprising water and carbon dioxide. A potential difference is produced between the anode 33 and the cathode 35. Via electrically conducting wires 41 the terminals of the anode 33 and the cathode 35 are connected to a load 44.

Oxygen-depleted air is removed through conduit 46 from the outlet 26 of the cathode side 20 and the anode off-gas is removed through conduit 47 from the outlet 18 of the anode side 15.

In heat exchanger 49 the anode off-gas is cooled and partially condensed so as to remove water from the anode off-gas in separator 51. Water is removed from separator 51 through conduit 54 and anode off-gas having a reduced water-content is passed through conduit 56 to compressor 57. The anode off-gas, a stream rich in carbon dioxide, is compressed in compressor 57 to a predetermined pressure which allows injecting the stream into an underground reservoir (not shown). The predetermined pressure is so selected that the carbon dioxide, after further cooling, can be injected into the underground reservoir by means of an injection pump (not shown). The compressor 57 is driven by electric motor 58 driven at least partly by electric energy generated by the electric generator 6.

The compressed stream rich in carbon dioxide is passed through conduit 60 via a water separation device 70 to the heat exchanger 11. The water separating device 70 discharges the separated water via a conduit 71 and a heat exchanger 72 into the separator 51. The stream rich in carbon dioxide flowing from the water separating device 70 is depleted from water such that the water level is low enough to present the formation of carbon dioxide hydrates.

The water separating device 70 preferably is a device in which the fluid stream is induced to flow at supersonic velocity through a conduit so as to decrease the fluid temperature below the water condensation point, which device further comprises swirl imparting means which impart a swirling motion to the fluid stream so that the condensed water droplets are separated from the gas stream by centrifugal forces. Such a water separating device is disclosed, for example, in Dutch patent application No. 8901841.

In the heat exchanger 11 the compressed stream is at least partly cooled by indirect heat exchange with the low pressure natural gas stream in conduit 8 upstream of the solid electrolyte fuel cell 10. From the heat exchanger 11 is removed a partially liquefied stream rich in carbon dioxide, which is passed to separator 63. If required a heat exchanger (not shown) can be included upstream of the separator 63, wherein more carbon dioxide is condensed by indirect heat exchange with a suitable refrigerant which is cooled in a separate cycle (not shown). The refrigerant is for example propane or ammonia.

In separator 63, uncondensable gas is separated from the liquefied stream rich in carbon dioxide. The uncondensable gas is removed through conduit 66, and the liquefied stream rich in carbon dioxide is removed through conduit 67.

The removed liquefied stream rich in carbon dioxide is supplied to an underground reservoir (not shown) where it is stored.

In heat exchanger 49 the heated low pressure natural gas can be further heated to the required operating temperature before it enters the solid oxide fuel cell 10. Additionally the air is supplied to the inlet 25 of the cathode side 20 of the solid oxide fuel cell 10 through conduit 37 can be heated by indirect heat exchange (not shown) with the anode off-gas, or with the oxygen-depleted air leaving the cathode side 20 though conduit 46.

In the embodiment of the invention as described with reference to FIG. 1, the conversion of methane to hydrogen and carbon monoxide is done in the anode side of the solid oxide fuel cell. At least part of this reaction can be done upstream of the solid oxide fuel cell in a separate reactor.

When the uncondensable gas from separator 63 contains unused hydrogen or carbon monoxide, it can be recycled to the anode side 15 of the solid oxide fuel cell 10. In accordance with the invention the solid oxide fuel cell is provided with a ceramic afterburner section in which unburned carbon monoxide and hydrogen are fully combusted substantially without adding nitrogen to the anode off-gas. This is accomplished by providing the solid electrolyte fuel cell 10 with an afterburner section 75 which comprises a high temperature ceramic oxide membrane 76 via which oxygen ($O_2$) is supplied to the anode off-gas stream. The membrane 76 preferably is an oxygen-permeable membrane which is a good oxygen-ion conductor. Suitable materials for such a membrane 76 are described in a paper "Ceramic Fuel Cells" by Nguyen Q. Minh in J.A. Ceramic Society, vol. 76(3), 563–588, 1993.

Suitably the solid oxide electrolyte is a mixture of 8% by mass of yttria and 92% by mass of zirconia, the anode comprises nickel and zirconia and the cathode comprises lanthanum manganite. The operating temperature of the solid oxide fuel cell is between 900 and 1000° C. and its operating pressure is between 0.1 to 1 MPa (gauge). The temperature of the liquefied stream rich in carbon dioxide is between 5 and 20° C. and its pressure is between 3 and 8 MPa (gauge).

The oxidant is suitably air, however, instead pure oxygen or oxygen-enriched air may be used as well.

The liquefied carbon dioxide can be stored in a receptacle which can be an underground reservoir, and which is suitably the underground reservoir from which the methane ($CH_4$) is produced.

In the embodiment as described with reference to FIG. 1, the compressor 57 is driven by electric motor 58. However, the turbo expander 3 can be directly connected to the compressor 57. In the described embodiment the turbo expander 3 as well as the compressor 57 comprise only one machine, however, they can include more then one machine, wherein the turbo expander comprises more than one machine interconnected in the known way and wherein the compressor comprises more than one machine interconnected in the known way.

Referring now to FIG. 2 there is shown a solid oxide fuel cell 80 which comprises an air supply 81 and a series of fuel cell tubes 82 through which air is circulated via air supply conduits 83 towards an exhaust conduit 84 for discharge of oxygen depleted nitrogen rich air from the fuel cell 80.

Methane ($CH_4$) containing natural gas is supplied to a series of interconnected compartments 85 of the fuel cell 10 via a gas inlet opening 86.

The outer surfaces of the fuel cell tubes 82 form the anode side and the inner surfaces of the fuel cell tubes 82 form the cathode side of the fuel cell 80.

A description of the performance of fuel cell tubes 83 as illustrated in FIG. 2 is given in the Kirk-Othmer Encyclopedia of Chemical Technology, Fourth Edition, volume 11, page 1114–1121, published by John Wiley & Sons, Inc.

The fuel cell 80 is provided with an afterburner installation 87 which comprises a series of ceramic oxygen separation tubes 88 to which air is supplied via air supply conduits 89 which are similar to the air supply conduits 83 of the fuel cell tubes 82.

The compartments 85 are connected in fluid communication with each other and with the interior of the afterburner installation 87 via openings 90. Valves 91 are present in the exhaust conduit 84 and the interior of the afterburner installation to control and balance the fluid flow through the fuel cell 80 and the afterburner installation 87.

The oxygen separation tubes 88 are made of a high temperature ceramic oxide membrane material which is permeable to oxygen and which is an oxygen-ion conductor, but which is substantially impermeable to nitrogen.

Therefore only a minimal quantity, if any, of nitrogen is added to the anode off-gas stream 92, whereas substantially pure oxygen is added for the combustion of any unburned carbon monoxide and hydrogen in said stream 92 in the afterburner installation 87. Hence an anode off-gas stream which is rich in carbon dioxide and poor in carbon monoxide, hydrogen and nitrogen flows from the afterburner installation 87 into the anode off-gas exhaust conduit 93, in which a fuel inlet 94 is present which is in communication with a conduit 94 for the supply of wet gas to a pre-reformer. The anode off-gas exhaust gas conduit 93 may further be connected to drying, cooling and compression equipment in the same way as illustrated with respect to the anode off-gas conduit 47 shown in FIG. 1.

I claim:

1. Process of generating electricity from natural gas using a solid oxide fuel cell comprising the steps of:
   (a) converting at the anode side of the fuel cell the natural gas to hydrogen and carbon monoxide and allowing the cathode and anode reactions to take place to produce a potential difference between anode and cathode wherein an anode off-gas is produced which comprises water and carbon dioxide;
   (b) removing oxygen-depleted oxidant from the outlet of the cathode side and removing the anode off-gas from the outlet of the anode side;
   (c) feeding the anode off-gas from the outlet of the anode side of the fuel cell to a ceramic afterburner installation comprising a membrane consisting of a high temperature ceramic oxide having a characteristic of being permeable to oxygen and impermeable to nitrogen, said high temperature ceramic oxide further being an oxygen-ion conductor;
   (d) partially condensing the anode off-gas and removing water from the anode off-gas to produce a stream rich in carbon dioxide;
   (e) compressing the stream rich in carbon dioxide to a predetermined pressure;
   (f) cooling the compressed stream rich in carbon dioxide at least partly by indirect heat exchange with the natural gas stream which is supplied to the fuel cell to obtain an at least partly liquefied stream rich in carbon dioxide;
   (g) separating uncondensable gas from the at least partly liquefied stream rich in carbon dioxide; and
   (h) injecting the at least partly liquefied stream rich in carbon dioxide into a receptacle;
   characterised in that the step (c) of feeding the anode off-gas to the afterburner installation comprises feeding the anode off-gas to the ceramic afterburner installation in which unburned carbon monoxide and hydrogen are combusted, passing an oxidant through said membrane, and then combining said membrane passed oxidant with said unburned carbon monoxide and hydrogen, wherein said combustion occurs without addition of additional nitrogen to the anode off-gas or membrane passed oxidant.

2. The process as claimed in claim 1, wherein step (a) comprises allowing in the anode side of the solid oxide fuel cell the heated low pressure natural gas stream to react with water to form hydrogen and carbon monoxide, and allowing the cathode and anode reactions to take place to produce a potential difference between anode and cathode wherein an anode off-gas is produced which comprises water and carbon dioxide.

3. The process as claimed in claim 1, wherein oxygen is supplied through the membrane to the anode off-gas.

4. The process as claimed in claim 1, wherein in step (d) water is separated from the stream rich in carbon dioxide by means of a water separating device in which the fluid stream is induced to flow at supersonic velocity through a conduit such that the fluid temperature is below the water condensation point, which conduit is provided with swirl imparting means which induce the condensed water droplets to be separated from the fluid stream by centrifugal forces.

5. The process as claimed in claim 1, wherein the receptacle is formed by the pore spaces of an underground earth formation.

6. The process as claimed in claim 5, wherein the underground earth formation is an oil and/or natural gas bearing formation.

7. The process as claimed in claim 6, wherein the liquefied stream rich in carbon dioxide is injected into the oil and/or natural gas bearing formation from which the natural gas which is supplied to the fuel cell is produced.

8. The process as claimed in claim 7, further comprising the steps of expanding the natural gas to a lower pressure in an expansion engine to produce energy and heating the low pressure natural gas stream by indirect heat exchange prior to feeding the natural gas stream to the solid oxide fuel cell.

9. A solid oxide fuel cell which is equipped with an afterburner installation, characterized in that the afterburner installation comprises a membrane consisting of a ceramic which is an oxygen-ion conductor having a characteristic of being permeable to oxygen and substantially impermeable to nitrogen, through which membrane oxygen is supplied to the anode off-gas for oxidation of unburned components in the anode off-gas.

10. The solid fuel cell with afterburner installation of claim 9, wherein the ceramic membrane is a high temperature oxygen ceramic oxide membrane.

11. The solid fuel cell with afterburner installation of claim 10, wherein the fuel cell and afterburner installation are both equipped with a series of ceramic membrane tubes which are closed at one end and through which air is circulated.

* * * * *